United States Patent
Wang et al.

(10) Patent No.: US 12,177,661 B2
(45) Date of Patent: Dec. 24, 2024

(54) METHOD AND DEVICE FOR VERIFYING USER IDENTIFICATION CARD, ELECTRONIC DEVICE AND STORAGE MEDIUM

(71) Applicant: SHENZHEN UCLOUDLINK NEW TECHNOLOGY CO., LTD., Guangdong (CN)

(72) Inventors: Liang Wang, Guangdong (CN); Enpeng Bai, Guangdong (CN); Zhihui Gong, Guangdong (CN)

(73) Assignee: SHENZHEN UCLOUDLINK NEW TECHNOLOGY CO., LTD., Guangdong (CN)

( * ) Notice: Subject to any disclaimer, the term of this patent is extended or adjusted under 35 U.S.C. 154(b) by 797 days.

(21) Appl. No.: 17/372,782

(22) Filed: Jul. 12, 2021

(65) Prior Publication Data

US 2021/0345107 A1    Nov. 4, 2021

Related U.S. Application Data

(63) Continuation-in-part of application No. PCT/CN2020/102138, filed on Jul. 15, 2020.

(30) Foreign Application Priority Data

Aug. 12, 2019   (CN) .......................... 201910738577.5

(51) Int. Cl.
*H04W 12/06* (2021.01)
*G06F 16/903* (2019.01)
*H04W 4/14* (2009.01)

(52) U.S. Cl.
CPC ...... *H04W 12/06* (2013.01); *G06F 16/90335* (2019.01); *H04W 4/14* (2013.01)

(58) Field of Classification Search
CPC .............................. H04W 12/06; H04W 12/43
See application file for complete search history.

(56) References Cited

U.S. PATENT DOCUMENTS

| | | | |
|---|---|---|---|
| 2004/0042442 A1* | 3/2004 | Pecen | H04W 12/04 370/352 |
| 2006/0172723 A1* | 8/2006 | Ishikawa | H04W 12/06 455/411 |

(Continued)

FOREIGN PATENT DOCUMENTS

| | | |
|---|---|---|
| CN | 103548389 A | 1/2014 |
| CN | 104410993 A | 3/2015 |

(Continued)

OTHER PUBLICATIONS

Emily Aiken et al. Phone Sharing and Cash Transfers in Togo: Quantitative Evidence from Mobile Phone Data. In Proceedings of the 5th ACM SIGCAS/SIGCHI Conference on Computing and Sustainable Societies (COMPASS '22). Association for Computing Machinery, New York, NY, USA, (2022) 214-231. (Year: 2022).*

(Continued)

*Primary Examiner* — Kari L Schmidt
(74) *Attorney, Agent, or Firm* — Robert L. Stearns; Dickinson Wright, PLLC

(57) ABSTRACT

The present application relates to the technical field of communication technology, and provides a method and a device for verifying a user identification card, an electronic device and a storage medium. The method includes: receiving a sharing request of the user identification card sent by a first communication device; sending a query request to at least one second communication device according to the sharing request of the user identification card; receiving the first query information sent by the second communication device; and comparing the first query information with the sharing information of the user identification card and/or (Continued)

preset condition information, to obtain a verification result of the user identification card. The method realizes that the automatic verification of the authenticity of the sharing information of the user identification card and the validity of the user identification card.

12 Claims, 12 Drawing Sheets

(56) References Cited

U.S. PATENT DOCUMENTS

| | | | | |
|---|---|---|---|---|
| 2007/0004457 | A1* | 1/2007 | Han | H04W 8/20 |
| | | | | 455/558 |
| 2015/0017950 | A1* | 1/2015 | Zhao | H04W 12/06 |
| | | | | 455/411 |
| 2015/0099562 | A1* | 4/2015 | Xiong | H04W 12/04 |
| | | | | 455/558 |
| 2015/0171909 | A1* | 6/2015 | Gao | H04B 1/3816 |
| | | | | 455/558 |
| 2015/0245195 | A1* | 8/2015 | Zhao | H04W 12/37 |
| | | | | 455/418 |
| 2016/0036871 | A1 | 2/2016 | Tsubone et al. | |
| 2016/0164883 | A1* | 6/2016 | Li | H04W 8/205 |
| | | | | 726/7 |
| 2016/0294831 | A1* | 10/2016 | Borunda | H04W 12/63 |
| 2017/0170856 | A1* | 6/2017 | Shen | H04M 15/765 |
| 2018/0191728 | A1 | 7/2018 | Kim et al. | |
| 2018/0211021 | A1* | 7/2018 | Negi | H04L 9/3231 |
| 2018/0234833 | A1* | 8/2018 | Tang | H04W 88/06 |
| 2018/0352417 | A1 | 12/2018 | Butler et al. | |
| 2019/0045354 | A1 | 2/2019 | Polehn et al. | |
| 2019/0052994 | A1 | 2/2019 | Dar | |
| 2019/0090124 | A1* | 3/2019 | Yang | H04W 12/06 |
| 2021/0029127 | A1* | 1/2021 | Stubblefield | H04W 12/71 |
| 2021/0345092 | A1* | 11/2021 | Wang | G06Q 30/0283 |
| 2022/0386119 | A1* | 12/2022 | Shen | H04W 12/06 |
| 2023/0037475 | A1* | 2/2023 | Liu | H04W 8/18 |

FOREIGN PATENT DOCUMENTS

| | | |
|---|---|---|
| CN | 105763464 A | 7/2016 |
| CN | 106068019 A | 11/2016 |
| CN | 106100865 A | 11/2016 |
| CN | 107659928 A | 2/2018 |
| CN | 107682910 A | 2/2018 |
| CN | 108600975 A | 9/2018 |
| CN | 108769954 A | 11/2018 |
| CN | 108924820 A | 11/2018 |
| CN | 110519761 A | 11/2019 |
| EP | 1689199 A1 | 8/2006 |
| EP | 3446504 | 10/2017 |
| WO | 2019032623 A1 | 2/2019 |

OTHER PUBLICATIONS

Sarker, Kaushik, and KM Muzahidul Islam. "Embedded Subscriber Identity Module with Context Switching." International Conference on Information, Communication and Computing Technology. Singapore: Springer Singapore, 2019, pp. 84-97. (Year: 2019).*

* cited by examiner

METHOD AND DEVICE FOR VERIFYING USER IDENTIFICATION CARD, ELECTRONIC DEVICE AND STORAGE MEDIUM

CROSS-REFERENCE TO RELATED APPLICATION

The present application is a continued-in-part of PCT application PCT/CN2020/102138, filed on Jul. 15, 2020, and claims priority of Chinese patent application with Application NO. 201910738577.5, filed on Aug. 12, 2019, the contents of which is incorporated herein by reference.

BACKGROUND OF THE INVENTION

1. Technical Field

The present application relates to the technical field of communication technology, and more particularly to a method and a device for verifying a user identification card, an electronic device and a storage medium.

2. Related Art

When sharing a user identification card to a platform or personal use through a sharing platform, whether the user identification card is valid, or the phone number information, tariff information, voice duration, number of short messages, data traffic and other information corresponding to the user identification card need to be checked and verified, which can only be queried manually at present, and leads to a long check and verification cycle of the sharing user identification cards, the efficiency is low and thus user experience is poor.

Technical Problem

In view of this, the embodiments of the present application provide a method and device for verifying a user identification card, an electronic device and storage medium to solve the problems of long verification period and low efficiency in the prior art.

BRIEF SUMMARY OF THE INVENTION

In a first aspect of the present application, a method for verifying a user identification card is provided, and the method includes: receiving a sharing request of the user identification card sent by a first communication device; wherein the sharing request of the user identification card comprises identification information of the user identification card and sharing information of the user identification card; sending a query request to at least one second communication device according to the sharing request of the user identification card; wherein the query request comprises the identification information of the user identification card; and the query request is configured for instructing the second communication device to query a first query information corresponding to the identification information of the user identification card; receiving the first query information sent by the second communication device; and comparing the first query information with the sharing information of the user identification card and/or preset condition information, to obtain a verification result of the user identification card.

The automatic verification of the authenticity of the sharing information of the user identification card and the validity of the user identification card corresponding to the user identification card is realized through the method for verifying the user identification card, the ease of use of the user identification card sharing system is improved, and the efficiency of the user identification card sharing system is improved.

In a second aspect of the present application, a device for verifying a user identification card is provided, the device includes: a sharing request receiving module, configured for receiving a sharing request of the user identification card sent by a first communication device; wherein the sharing request of the user identification card comprises identification information of the user identification card and sharing information of the user identification card; a query request sending module, configured for sending a query request to at least one second communication device according to the sharing request of the user identification card; wherein the query request comprises the identification information of the user identification card; and the query request is configured for instructing the second communication device to query a first query information corresponding to the identification information of the user identification card; a query information receiving module, configured for receiving the first query information sent by the second communication device; and a verification module, configured for comparing the first query information with the sharing information of the user identification card and/or preset condition information, to obtain a verification result of the user identification card.

In a third aspect of the present application, an electronic device is provided, and the electronic device includes: a memory, a processor, and a computer program stored in the memory and running on the processor; the processor executes the computer program implementing the steps of the method for verifying a user identification card described in the first aspect; the computer program includes: a sharing request receiving module, a query request sending module, a query information receiving module and a verification module; and processor the executes the computer program implementing the functions of the modules in second aspect.

In a fourth aspect of the present application, a computer readable storage medium is provided, the computer readable storage medium is stored with a computer program, and the processor executes the computer program implementing the steps of the method for verifying a user identification card described in the first aspect.

In a fifth aspect of the present application, a computer program product is provided, and when the computer program runs on the electronic device, the electronic device executes the steps of the method for verifying a user identification card described in the first aspect.

It can be understood that, for the beneficial effects of the second aspect to the fifth aspect described above, reference may be made to the relevant description in the first aspect described above, and details are not repeated here.

BRIEF DESCRIPTION OF THE DRAWINGS

In order to explain the embodiments of the present invention more clearly, a brief introduction regarding the accompanying drawings that need to be used for describing the embodiments of the present invention or the prior art is given below; it is obvious that the accompanying drawings described as follows are only some embodiments of the present invention, for those skilled in the art, other drawings can also be obtained according to the current drawings on the premise of paying no creative labor.

DETAILED DESCRIPTION OF PREFERRED EMBODIMENTS

In the following description, for the purpose of illustration rather than limitation, specific details such as a specific system structure and technology are proposed for a thorough understanding of the embodiments of the present application. However, it should be clear to those skilled in the art that the present application can also be implemented in other embodiments without these specific details. In other cases, detailed descriptions of well-known systems, devices, circuits, and methods are omitted to avoid unnecessary details from obstructing the description of the present application.

In order to illustrate the technical solution described in the present application, specific embodiments are used for description below.

Figure 1:
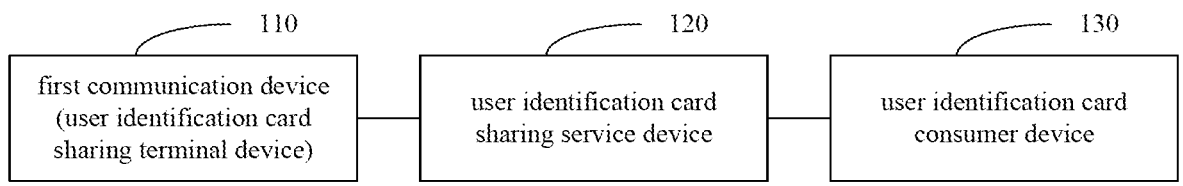
FIG. 1 is a schematic structural diagram of a user identification card sharing system provided by an embodiment of the present application.

FIG. 1 shows the structure of a user identification card sharing system provided by an embodiment of the present application, which includes: a first communication device 110, a user identification card sharing service device 120, and a user identification card consumer device 130.

As shown in FIG. 1, the first communication device 110 is the user identification card sharing terminal device. The user identification card sharing service device 120 shares the resource of the user identification card, and the user identification card consumer device 130 acquires the resource of the user identification card through the user identification card sharing service device 120.

The first communication device is a device configured for initiating a sharing request of the user identification card and sending sharing information.

The first communication device includes but is not limited to the following devices: a fixed terminal device, a mobile terminal device, a user identification card pool, a virtual user identification card pool, and a virtual user identification card server.

The first communication device further includes: a control device that runs application software or a World Wide Web (web) application, the control device is configured to control a device that carries a user identification card device, and the control device is configured to initiate the sharing request of the user identification card and sending sharing information.

Among them, the user identification card includes, but is not limited to, a chip, an embedded chip, or a virtual chip that stores the user information of the digital mobile phone, the encryption key, and the phone book of the user. The user identification card is configured for user identification of a digital mobile communication network and configured for user communication encryption. The user identification card includes but is not limited to SIM (Subscriber Identification Module) card, UIM (User Identity Model) card, USIM (Universal Subscriber Identity Module) card, eSIM (Embedded SIM) card, softSIM card, vSIM (virtual SIM) card and other forms.

The resources of the user identification card include, but are not limited to, communication resources corresponding to the user identification card: data traffic margin, voice duration margin, and short message margin.

The user who initiates the sharing initiates a sharing request for sharing the user identification card to the user identification card sharing service device through the first communication device (that is, the user identification card sharing terminal device). The sharing request includes identification information of the user identification card, for example, IMSI (International Mobile Subscriber Identity) information and sharing information of the user identification card. The shared information of the user identification card includes but is not limited to the following information corresponding to the user identification card: phone number information, sharing data traffic information, sharing voice call duration information, sharing short message quantity information, user identification card owner operator, starting sharing time and ending sharing time, etc. However, the accuracy of the sharing information of the user identification card cannot be directly obtained by reading the user identification card through the user identification card sharing terminal device. For example, the data traffic margin information corresponding to the user identification card cannot be obtained directly by reading the user identification card. Therefore, the user identification card needs to be verified to determine whether the user identification card can be shared. Manually verifying information such as package tariffs and communication resources corresponding to the user identification card is relatively inefficient. In the absence of a MODEM (modulation and demodulation module), it is necessary to plug and unplug the user identification card multiple times on the device with MODEM, to complete the query of the tariff information corresponding to the user identification card and the verification of the sharing information of the user identification card.

Figure 2:
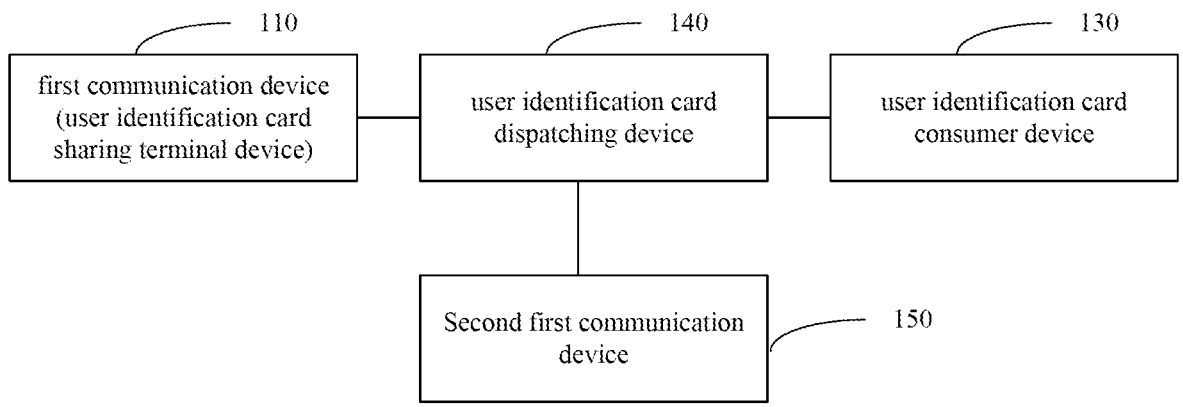
FIG. 2 is a schematic structural diagram of another user identification card sharing system provided by an embodiment of the present application.

FIG. 2 shows the structure of another user identification card sharing system provided by an embodiment of the present application, which includes: a first communication device 110, a user identification card dispatching device 140, a user identification card consumer device 130, and a second communication equipment 150.

As shown in FIG. 2, the user identification card dispatching device 140 sends a query request to the second communication device 150 according to the sharing request of the user identification card issued by the first communication device 110 (that is the user identification card sharing terminal device), to query the first query information corresponding to the user identification card; the user identification card dispatching device 140 compares the first query information with the sharing information and/pre-set condition information in the sharing request of the user identification card to verify the authenticity of the sharing information of the user identification card carried by the sharing request of the user identification card, and to compare with the preset condition information to determine the validity of the user identification card; if the sharing information of the user identification card is true, the preset condition information is used to determine that the user identification card is valid, then the user identification card dispatching device allocates the user identification card to the user identification card consumer device 130 for use, or the user identification card dispatching device allocates the user identification card to the user identification card consumer device 130 for use through the user identification card sharing service device 120.

Among them, the first query information includes but is not limited to the following information: information corresponding to the user identification card and query status information. Among them, the information corresponding to the user identification card includes but is not limited to: phone number information, tariff information, data traffic margin, voice duration margin, short message margin and other information. The query status information includes, but is not limited to, query success information, query failure information, query error information, and other information indicating the current query status. Among them, the second communication device includes, but is not limited to, a query interface server that an operator or a third party provides a query interface, or a voice query server provided by an operator or a third party, or a short message query server provided by an operator or a third party, etc., which is a device that can be used to query the information corresponding to the user identification card.

Among them, the user identification card dispatching device includes, but is not limited to, the following devices or functional units of the device that can realize the above functions: computer/server, functional unit of user identification card shared service device, server cluster or distributed server.

Among them, the user identification card consumer device includes, but is not limited to, the following devices that request to share the user identification card: terminal devices, virtual devices, and platform devices. The platform device is a device that provides communication services for other users.

Figure 3:
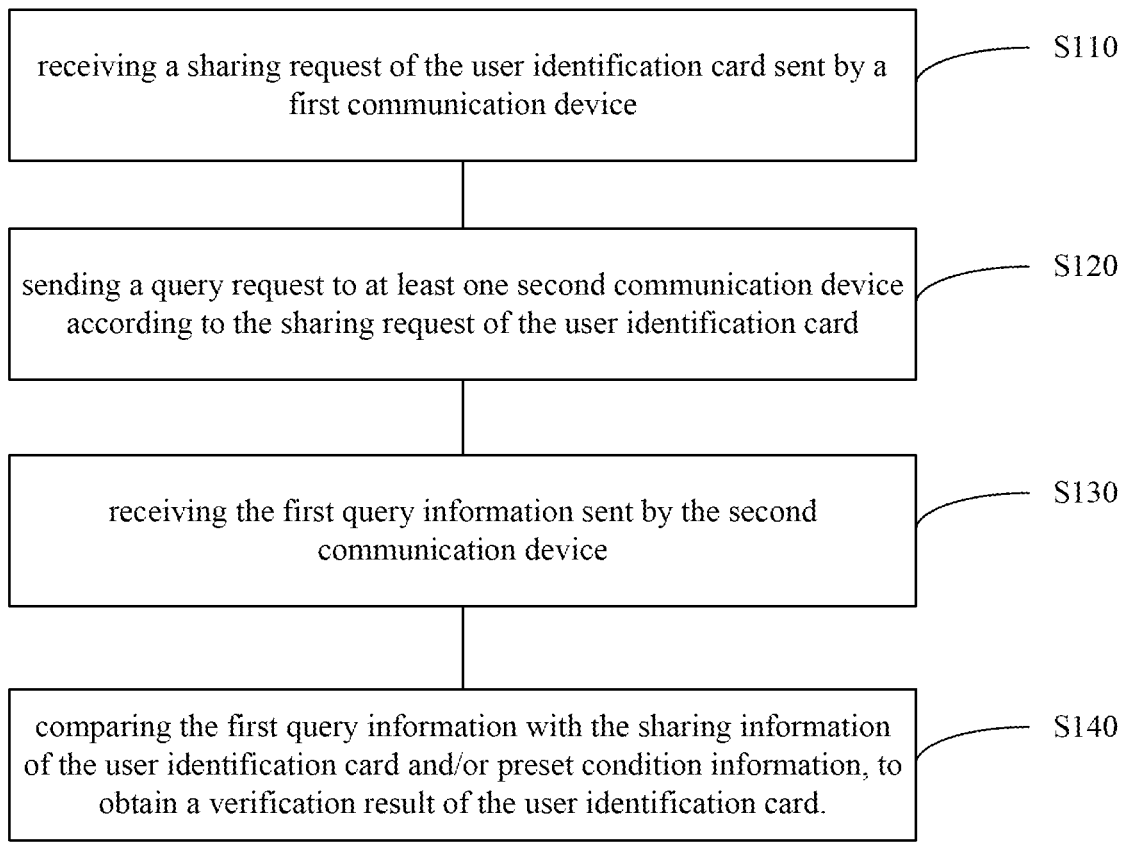
FIG. 3 is a schematic flowchart of a method for verifying a user identification card provided by an embodiment of the present application.

FIG. 3 shows a schematic flow of a method for verifying a user identification card provided by an embodiment of the present application. The method includes steps S110 to S140; as an example and not a limitation, the method can be applied to the above-mentioned user identification card dispatching device.

S110: receiving a sharing request of the user identification card sent by a first communication device; wherein the sharing request of the user identification card includes identification information of the user identification card and sharing information of the user identification card.

Among them, the first communication device is a communication device installed with user identification card and user identification card sharing software. The user identification card includes but is not limited to the following forms: SIM card, UIM card, USIM card, eSIM card, softSIM and vSIM etc.

In a non-limiting manner, the first communication device and the user identification card dispatching device may be connected in a wired and/or wireless manner to send the sharing request of the user identification card through the connection.

In a non-limiting manner, the user identification includes but is not limited to IMSI, ICCID (Integrate Circuit Card Identity), and other identification information that can uniquely identify user information and user identification card information.

In a non-limiting manner, the sharing information of the user identification card includes but is not limited to the following information: phone number information, shared data traffic information, shared voice call duration information, shared short message quantity information, operator of the user identification card, starting sharing time and ending sharing time, etc. In this example, the phone number information, the shared data traffic information, the shared voice call duration information, and the shared short message quantity information corresponding to the user identification card are information that needs to be verified by the method for verifying the user identification card provided in the embodiment of the present application, to determine whether the above sharing information is true and valid.

S120: sending a query request to at least one second communication device according to the sharing request of the user identification card; wherein the query request comprises the identification information of the user identification card; and the query request is configured for instructing the second communication device to query a first query information corresponding to the identification information of the user identification card.

In a non-limiting manner, the user identification card dispatching device and the second communication device may be connected in a wired and/or wireless manner to send the query request through the connection.

In a non-limiting manner, the query request includes identification information of the user identification card, for example, IMSI information.

In a non-limiting example, the user identification card dispatching device identifies the operator to which the phone number belongs according to the phone number information in the sharing request of the user identification card, and sends a query request to the query server of the operator of the phone number.

In another non-limiting example, the user identification card dispatching device sends a query request to the query server of the operator according to the operator information in the sharing request of the user identification card.

In another non-limiting example, the user identification card dispatching device sends a query request to the third party query server according to the sharing request of the user identification card.

In another non-limiting example, the user identification card dispatching device transmits query request through an intermediate device, or instructs the intermediate device to send the query request to the query server of the operator or a third party according to the sharing request of the user identification card.

In another non-limiting example, the user identification card dispatching device simultaneously or successively sends query requests to multiple second communication devices according to the sharing request of the user identification card, and the second communication device includes but are not limited to: a query interface server that the operator provides the query interface, a voice query server, a short message query server, a query interface server provided by a third party, a voice query server and a short message query server.

S130: receiving the first query information sent by the second communication device.

In a non-limiting manner, the first query information includes but is not limited to the following information: information corresponding to the user identification card and query status information. Among them, the information corresponding to the user identification card includes but is not limited to: phone number information, tariff information, data traffic margin, voice duration margin, short message margin and other information. The query status information includes, but is not limited to, query success information, query failure information, query error information, and other information indicating the current query status.

Exemplarily, in the non-limiting example of step S120, the second communication device receives the query request sent by the user identification card dispatching device, and the second communication device queries for corresponding user information according to the identification information in the query request, for example, the phone number information, the tariff information, the data traffic margin, the voice duration margin, and the short message margin information. The second communication device sends the above-mentioned information to the user identification card dispatching device in the form of an agreed interface, or in the form of voice, or in the form of a short message as the first query information.

S140: comparing the first query information with the sharing information of the user identification card and/or preset condition information, to obtain a verification result of the user identification card.

The user identification card sharing device compares the first query information with the sharing information of the user identification card to determine the authenticity of the sharing information of the user identification card; by comparing the first query information with the preset condition information to determine the validity of the user identification card.

When the shared user identification query information meets both authenticity and validity, the verification result is successful; or when the query information is compared with the sharing information and it is determined that the sharing information meets the authenticity, the preset condition is a null value, that is when the preset conditions are not set, the verification result is successful; or when the query information is compared with the preset conditions, it can be directly concluded that the query information meets the preset conditions, then the authenticity of the sharing information can be verified or not, that is, the verification result is successful; or when the query information is compared with the preset conditions and the query information does not meet the preset conditions, the verification result is a failure; or when the query information is compared with the sharing information, it is determined that the sharing information does not meet the authenticity and does not set the preset condition, the verification result is a failure.

Among them, the preset condition information is a condition set by the user identification card dispatching device, the condition is used to verify whether the user identification card can be validly shared and used, and the preset condition information includes at least one of the following conditions: threshold condition information and attribute condition information of the user identification card; wherein the threshold condition information includes at least one of the following thresholds: a tariff balance threshold, a data traffic margin threshold, a voice duration margin threshold, and a short message margin threshold. The attribute condition of the user identification card is whether the user identification card is an Internet of Things card.

Among them, by comparing the first query information with the sharing request information, the authenticity of the sharing request information is verified; by comparing the first query information with preset condition information, to verify the validity of the tariff balance, the data traffic margin, the voice time margin and short message margin corresponding to the user identification card relative to the threshold conditions in the preset conditions, or to verify the validity of the phone number corresponding to the user identification card relative to the attribute conditions of the user identification card in the preset conditions; and then obtain the verification result of whether the user identification card can be shared and used.

In a non-limiting example, the attribute condition of the user identification card is that the user identification card is a not an Internet of Things card. Of course, when those skilled in the art implement the solution provided in the present application, the attribute conditions of the user identification card can also be restricted according to the actual situation to meet the needs of different implementation manners.

In a non-limiting example, the threshold conditions can be set as: the balance of the tariff is greater than or equal to 100 yuan, the margin of data traffic is greater than or equal to 10 GB, the margin of voice duration is greater than or equal to 60 minutes, the margin of short messages is greater than or equal to 20, etc. Those skilled in the art should understand that the threshold conditions can be adjusted according to actual conditions when the solution provided in the present application is actually implemented, so as to adapt to the needs of different implementations to achieve the best effect of the implementation.

In a non-limiting example, the user identification card dispatching device compares the tariff balance information, the tariff package information, the phone number information, the data traffic margin, the voice duration margin, the short message margin, etc. received in the first query information, and/or the threshold conditions in the preset condition information with the attribute conditions of the user identification card.

In a non-limiting manner, the data traffic margin, the voice margin, the short message margin and other information in the first query information has a margin greater than or equal to the sharing data traffic, the sharing voice call duration, and the number of sharing short messages in the sharing request; and the data traffic margin, the voice margin, the short message margin and other information in the first query information has a margin greater than or equal to the data traffic margin threshold and the voice duration margin threshold in the threshold condition. Then, it is determined that the sharing information in the sharing request is true and valid information; the verification result is successful; the user identification card dispatching device can allocate the user identification card to the user identification card consumer device for use.

In a non-limiting manner, the data traffic, the voice margin, the short message margin and other information in the first query information has a margin greater than or equal to the sharing data traffic, the sharing voice call duration, and the number of sharing short messages in the sharing request; or the data traffic, the voice margin, the short message margin and other information in the first query information has a margin greater than or equal to the data traffic margin threshold and the voice duration margin threshold in the threshold condition. Then, it is determined that the sharing information in the sharing request is true and valid information; the verification result of the sharing information of the user identification card and/or the preset condition information is successful; the user identification card dispatching device can allocate the user identification card to the user identification card consumer device for use.

In a non-limiting manner, when the tariff balance information in the first query information converted into the available data traffic, the voice margin and the short message margin, etc. has a margin being greater than or equal to the data traffic margin threshold in the threshold condition according to the tariff package information. Then, it is determined that the sharing information in the sharing request is valid information; and the verification result of the sharing information of the user identification card and/or the preset condition information is successful; the user identification card dispatching device can allocate the user identification card to the user identification card consumer device for use.

In a non-limiting manner, when the phone number information in the first query information is the same as the phone number information in the sharing information, but the tariff balance information in the first query information is less than the tariff balance threshold in the preset condition information, then the verification result of the sharing information of the user identification card and/or the preset condition information is a failure; the user identification card dispatching device stops allocating the user identification card to the user identification card consumer device for use.

In a non-limiting manner, when the tariff balance information in the first query information is in arrears and the tariff package information in the first query information is a post-paid tariff package, and the maximum arrears amount of the user corresponding to the user identification card is greater than the tariff balance threshold. Then the verification result of the sharing information of the user identification card and/or the preset condition information is successful; the user identification card dispatching device can allocate the user identification card to the user identification card consumer device for use.

In a non-limiting manner, the attribute condition of the user identification card in the preset condition information is a non-Internet of Things card, it is determined that the shared user identification card is an Internet of Things card according to the phone number information in the first query information, for example, the phone number information is determined to be a unique number segment of the Internet of Things card such as 147, 184, 178, and 145; then the verification result is that the user identification card is an Internet of Things card, and the verification result is a failure.

In a non-limiting manner, when the user identification card dispatching device sends query requests to more than one second communication device, the multiple first query information obtained are all query failure or query error information, or the phone number information of the multiple first query information do not match the phone number information in the sharing information of the user identification card, then the shared information of the user identification card and/or the preset condition information, that is, the verification result of the corresponding information of the user identification card is a failure, and the user identification card dispatching device stops allocating the user identification card to the user identification card consumer device for use.

Those skilled in the art should understand that when implementing the technical solution provided in this application, the user identification card sharing device can be set according to the actual situation, that is, the parameters of the sharing request issued by the first communication device; or the parameters of the preset condition information can be set according to the actual situation; or a combination of the sharing request parameters and preset condition information parameters. Those skilled in the art make the selection of the above parameters according to the actual situation to verify the authenticity of the sharing information, or compare the preset condition information with the query information to determine that the shared user identification card can be validly shared and used, which does not exceed the scope of protection of the present application.

Figure 4:
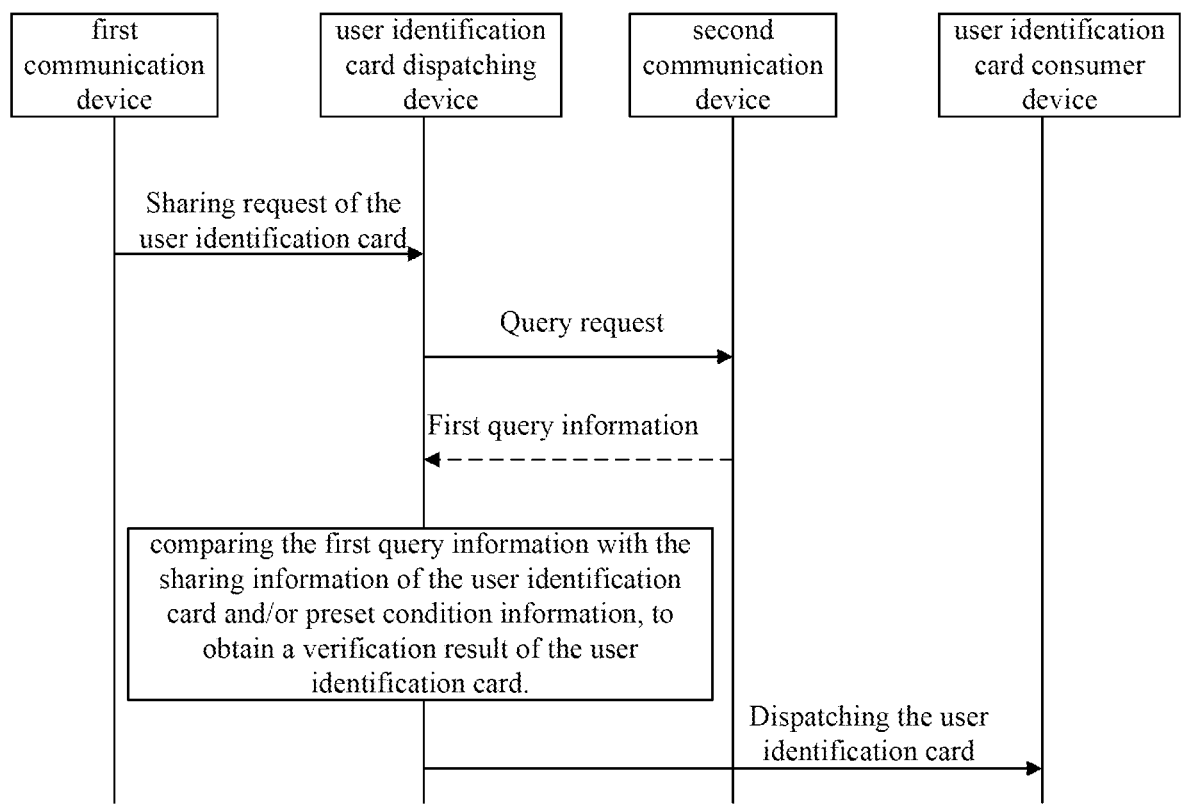
FIG. 4 is a schematic diagram of information interaction of a method for verifying a user identification card provided by an embodiment of the present application.

Corresponding to the method shown in FIG. 3 above, FIG. 4 shows the information interaction flow chart of method for verifying information provided by the embodiment of the present application. As shown in FIG. 4, the user identification card dispatching device receives the sharing request of the user identification card of the first communication device, and sends an query request to the second communication device according to the sharing request to obtain the first query information; comparing the sharing information and/or preset condition information with the user identification card to obtain the verification result of the corresponding information of the user identification card; if it is determined that the shared information of the user identification card is true information, and determining the user identification card is valid when comparing to the preset condition information, then the user identification card is allocated to the user identification card consumer device for use. The automatic verification of the sharing information of the user identification card and/or preset condition information is realized, thereby avoiding the waste of human resources and inefficiency caused by manual verification, thereby improving the ease of use of the user identification card sharing system, and improves the efficiency of the user identification card sharing system.

Figure 5:
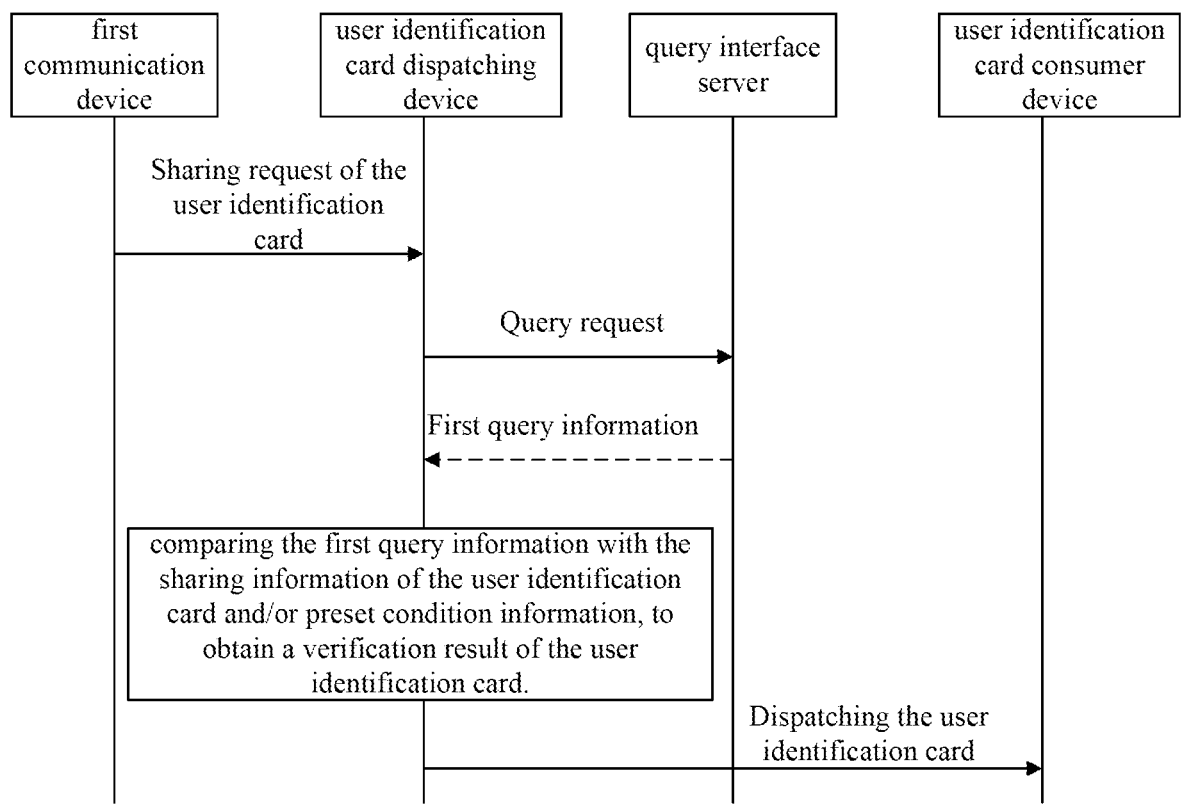
FIG. 5 is a schematic diagram of information interaction of another method for verifying a user identification card provided by an embodiment of the present application.

On the basis of the above-mentioned embodiment shown in FIG. 4, FIG. 5 shows an information interaction flow chart of another method for verifying information provided by an embodiment of the present application, where the second communication device in FIG. 5 is a query interface server. The query interface server is a device that provides an interface for querying the corresponding information of the user identification card, and its query interface can be dispatched by the user identification card dispatching device; the query interface server receives the query request sent by the user identification card dispatching device through the interface provided by it; the query interface server queries the query information corresponding to the user identification card through the identification information of the user identification card included in the query request, and the query interface server feeds back the first query information to the user identification card dispatching device through the interface provided by the query interface server. Among them, the query interface server includes, but is not limited to, servers, server clusters, and distributed servers provided by operators with query interfaces, and servers, server clusters, and distributed servers provided by third party organizations.

Figure 6:
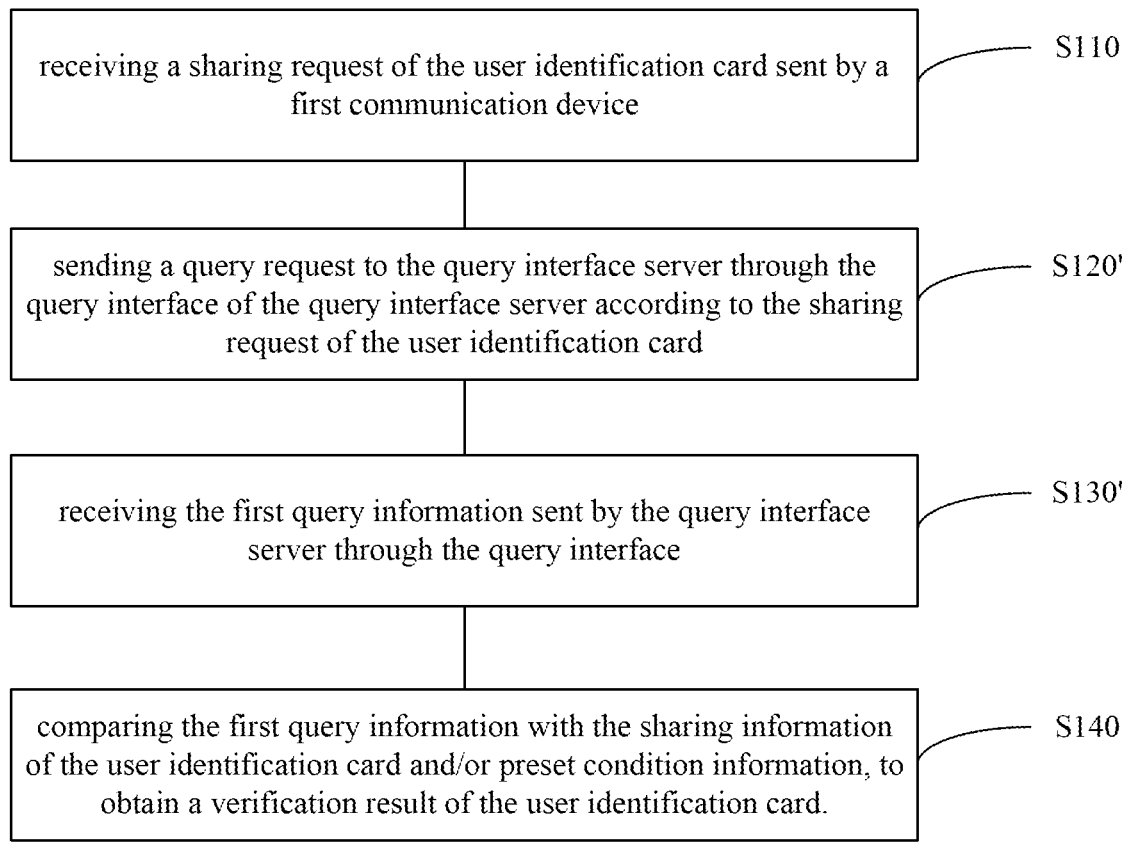
FIG. 6 is a schematic flowchart of another method for verifying a user identification card provided by an embodiment of the present application.

Corresponding to the method shown in FIG. 5 above, FIG. 6 shows the flow chart of the method, as shown in FIG. 6, in this example, Step S120: the sending a query request to the second communication device according to the sharing request of the user identification card includes:

Step S120': sending a query request to the query interface server through the query interface of the query interface server according to the sharing request of the user identification card.

Accordingly, in this example,

Step S130: receiving the first query information sent by the second communication device includes:

Step S130': receiving the first query information sent by the query interface server through the query interface.

In a non-limiting example, the query interface server provided by the operator sends a query request to query the balance through the following interface:

https://api.xxoperators.com/query/balance
Parameters: imsi
Type: String
Must: Yes
Description: imsi is the international mobile user identification code
An example query is:
curl-XPOST-d'imsi=31015012345xxxx"https://api.xxoperators.com/query/balance'

Correspondingly, an example of the first query information received through the query interface, that is, the balance information is:

```
"Content-Type": "application/json; charset=utf-8"
{
"code": 200, //The operation is successful
  "balance": "88 yuan" //Return balance information
}
```

In a non-limiting example, the query interface server is provided to the operator to send a query request to query the phone number information corresponding to the user identification card through the following interface:

https://api.xxoperators.com/query/phonenumber
  Parameters: imsi
  Type: String
  Must: Yes
  Description: imsi is the international mobile user identification code
  An example query is:
  curl-X POST d'imsi=31015012345xxxx"https://api.xxoperators.com/query/phonenumber'

Correspondingly, an example of the first query information received through the query interface, that is, the phone number information is:

```
"Content-Type": "application/json; charset=utf-8"
{
"code": 200, //The operation is successful
  "phonenumber": "00140880xxxxx" //Return phone number information
}
```

It should be noted that the above example of the query interface is for those skilled in the art to better understand the application, rather than limiting the application. When actually implementing the method for verifying information provided in the present application, those skilled in the art can make corresponding adjustments according to the documents provided by the interface provider.

In this example, the query information corresponding to the user identification card is queried through the query interface server to verify the sharing information of the user identification card. The technical solution is easy to implement, and the query information corresponding to the user identification card can be obtained quickly and accurately, thereby improving verification efficiency.

Figure 7:
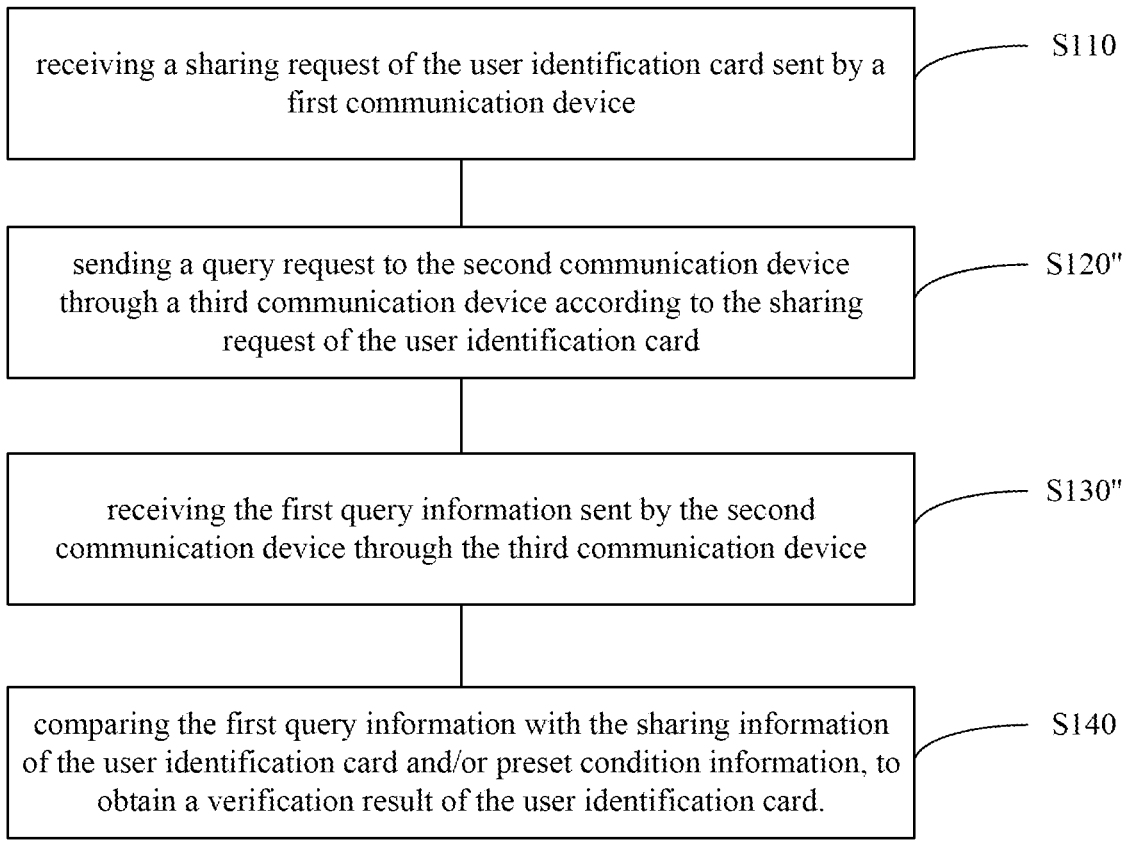
FIG. 7 is a schematic flowchart of another method for verifying a user identification card provided by an embodiment of the present application.

On the basis of the above-mentioned embodiment shown in FIG. 3, FIG. 7 is a schematic flow chart of another method for verifying a user identification card provided in an embodiment of the present application.

As shown in FIG. 7, step S120: the sending a query request to the second communication device according to the sharing request of the user identification card includes:

Step S120": sending a query request to the second communication device through a third communication device according to the sharing request of the user identification card.

Correspondingly, step S130: the receiving the first query information sent by the second communication device, includes:

Step S130": receiving the first query information sent by the second communication device through the third communication device.

Among them, the third communication device is at least one of the following devices for receiving the identification information of the user identification card and communicating through the identification information of the user identification card: a mobile terminal, fixed terminal, a modem module, a modem module pool, an Internet phone server and a short message server. The third communication device can be used for at least one of the following communication purposes: initiating or receiving voice calls, and sending or receiving short messages.

In a non-limiting example, by sending shared identification information of the user identification card to a fixed terminal device, the terminal device can use the shared identification information of the user identification card to make a voice call or send a short message. The user identification card dispatching device instructs the terminal device to initiate a voice call to the voice query server of the operator, for example, query phone 10010 of China Unicorn, to connect to the voice query server of China Unicorn, the user identification card dispatching device controls the terminal to issue a query request in a virtual dial mode to instruct the voice query server to feedback corresponding voice query information or short message query information.

Figure 8:
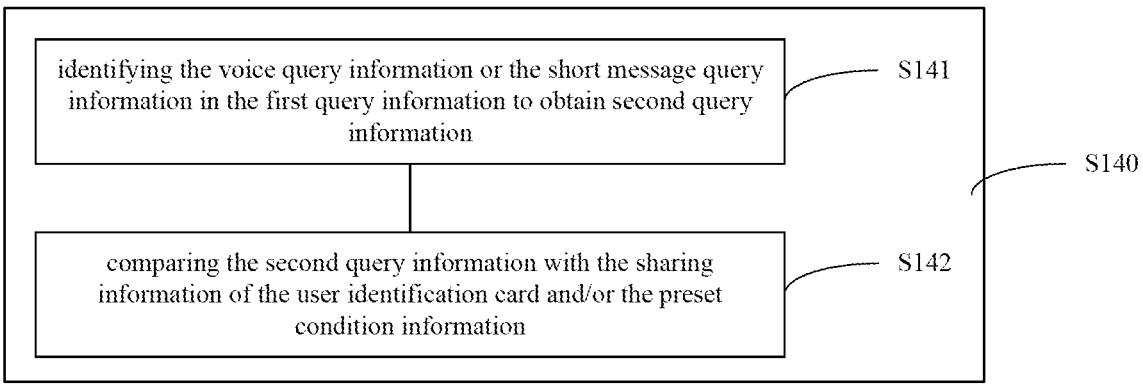
FIG. 8 is a schematic flowchart of a preferred method for verifying a user identification card provided by an embodiment of the present application.

On the basis of the above-mentioned embodiment shown in FIG. 7, FIG. 8 shows the flow chart of a preferred method for verifying information provided by an embodiment of the present application.

As shown in FIG. 8, in step S140: comparing the first query information with the sharing information of the user identification card and/or the preset condition information, includes:

S141: identifying the voice query information or the short message query information in the first query information to obtain second query information;

S142: comparing the second query information with the sharing information of the user identification card and/or the preset condition information.

Those skilled in the art should understand that the user identification card dispatching device controls the terminal to issue a query request to instruct the voice query server to feedback corresponding voice query information or short message query information. This can be achieved through software methods, and those skilled in the art should have the ability to implement this scheme according to the teachings of the present application.

In this example, the third communication device uses a voice call or short message to query the query information corresponding to the user identification card, and the user identification card corresponding to the user identification card can be automatically obtained when the operator or third-party organization does not provide a query interface, or to provide supplementary query information when the operator or third party organization provides a query interface, but the query interface cannot meet the requirements of verifying the sharing information and/or preset condition information of the user identification card; thereby realizing the purpose of automatically verifying the sharing information of identification card and/or preset condition information to improve the efficiency of the user identification card sharing system.

Through the voice query server or the short message query server provided by the third communication device capable of implementing voice calls or sending short message functions to the second communication device (that is, the operator or a third-party organization) to obtain the first query information, wherein the first query information includes the voice query information or the short message query information.

Figure 9:
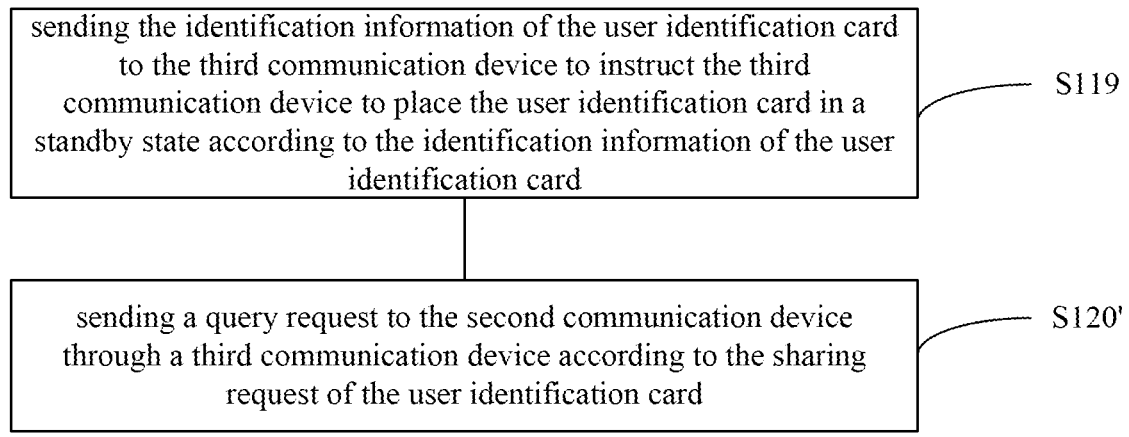
FIG. 9 is a schematic flowchart of another preferred method for verifying a user identification card provided by an embodiment of the present application.

On the basis of the above-mentioned embodiment shown in FIG. 7, FIG. 9 shows the flow chart of another preferred method for verifying information provided by an embodiment of the present application.

As shown in FIG. 9, in step S120', before sending the query request to the second communication device through the third communication device, the method further includes:

Step S119: sending the identification information of the user identification card to the third communication device to instruct the third communication device to place the user identification card in a standby state according to the identification information of the user identification card.

Figure 10:
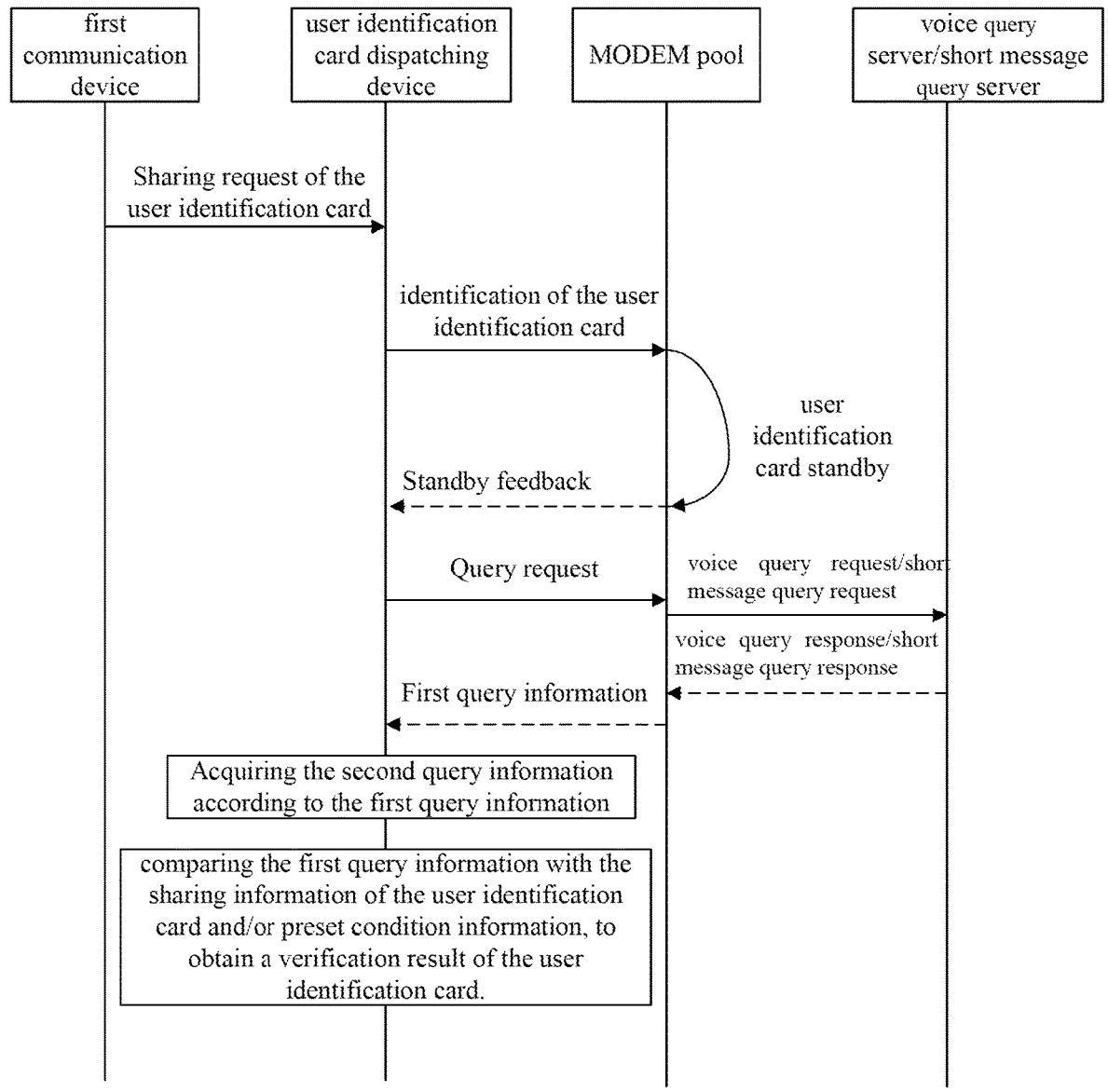
FIG. 10 is a schematic diagram of information interaction of another method for verifying a user identification card provided by an embodiment of the present application.

On the basis of the above-mentioned embodiment shown in FIG. 6, in a preferred embodiment, the third communication device is a modem module (MODEM) pool. FIG. 10 shows an information interaction flow chart of another method for verifying information provided by an embodiment of the present application.

As shown in FIG. 10, in a non-limiting example, the third communication device is the MODEM pool, and the first communication device sends a sharing request of the user identification card to the user identification card dispatching device; after the user identification card dispatching device receives the sharing request, extracting the identification information of the user identification card in the sharing request and sending it to the MODEM pool to instruct the MODEM pool to put the user identification card in the standby state according to the identification information of the user identification card; the MODEM pool can feedback the standby feedback of the user identification card to the user identification card dispatching device to notify the user that the user identification card dispatching device is in the standby state, or it may not feedback the standby state of the user identification card by default; the user identification card dispatching device sends a query request to the MODEM pool, to instruct the MODEM pool to initiate a voice call request to the voice query server or a short message query request to the short message query server according to the identification information of the user identification card; after the user identification card dispatching device obtains the voice query response or short message query response of the voice query server or the short message query server through the MODEM pool is obtained, the query information corresponding to the specific user identification card can be obtained by identifying the voice query response or short message query response, such as the phone number information, the tariff information, the data traffic margin, the voice duration margin and the short message margin and other information; the user identification card dispatching device compares the query information corresponding to the user identification card with the sharing information and/or the preset condition information of the user identification card to obtain the verification result of the corresponding information of the user identification card. In this example, by introducing the MODEM pool, firstly, the sharing information and/or the preset condition information of the user identification card can be automatically verified without the query interface server. Secondly, the identification information of the user identification card is sent to the MODEM pool to instruct the MODEM pool is placed in the standby state of shared user identification card, which not only can realize batch automatic verification of user identification cards, but also avoids manual insertion and removal of user identification cards, and improves the verify efficiency of the sharing information and/or preset condition information of user identification card.

Figure 11:
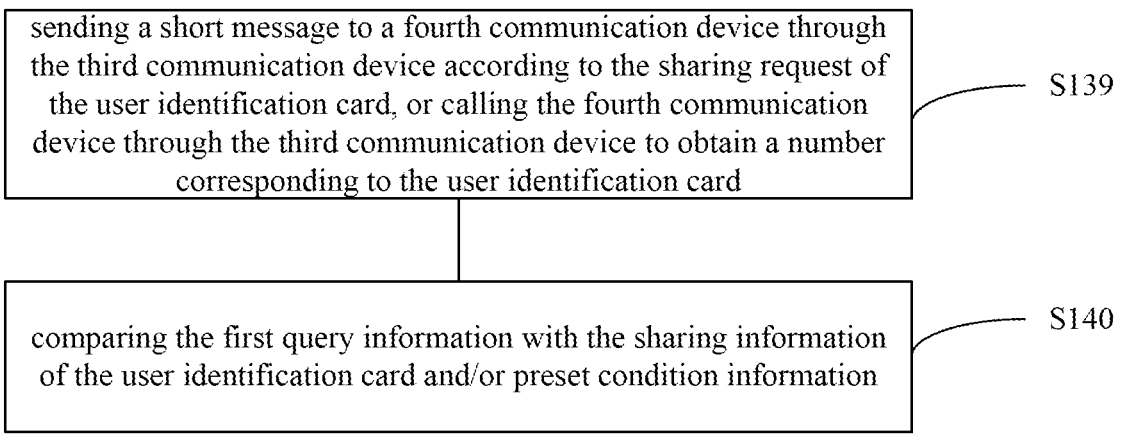
FIG. 11 is a schematic flowchart of another method for verifying information provided by an embodiment of the present application.

On the basis of the above-mentioned embodiment shown in FIG. 6, FIG. 11 shows the flow chart of another method for verifying information provided by an embodiment of the present application, so that In the case of the phone number information corresponding to the user identification card cannot be obtained in the method shown in FIG. 6, acquiring the phone number information of the shared user identification card.

As shown in FIG. 11, in step S140, before comparing the first query information with the sharing information of the user identification card and/or the preset condition information, the method further includes:

Step S139, sending a short message to a fourth communication device through the third communication device according to the sharing request of the user identification card, or calling the fourth communication device through the third communication device to obtain a number corresponding to the user identification card.

Among them, the fourth device includes, but is not limited to: a user identification card with a known number and placed in a standby state in a modem or modem pool; a communication device with a known number that communicates through a virtual number interface; a known number terminal device.

Figure 12:
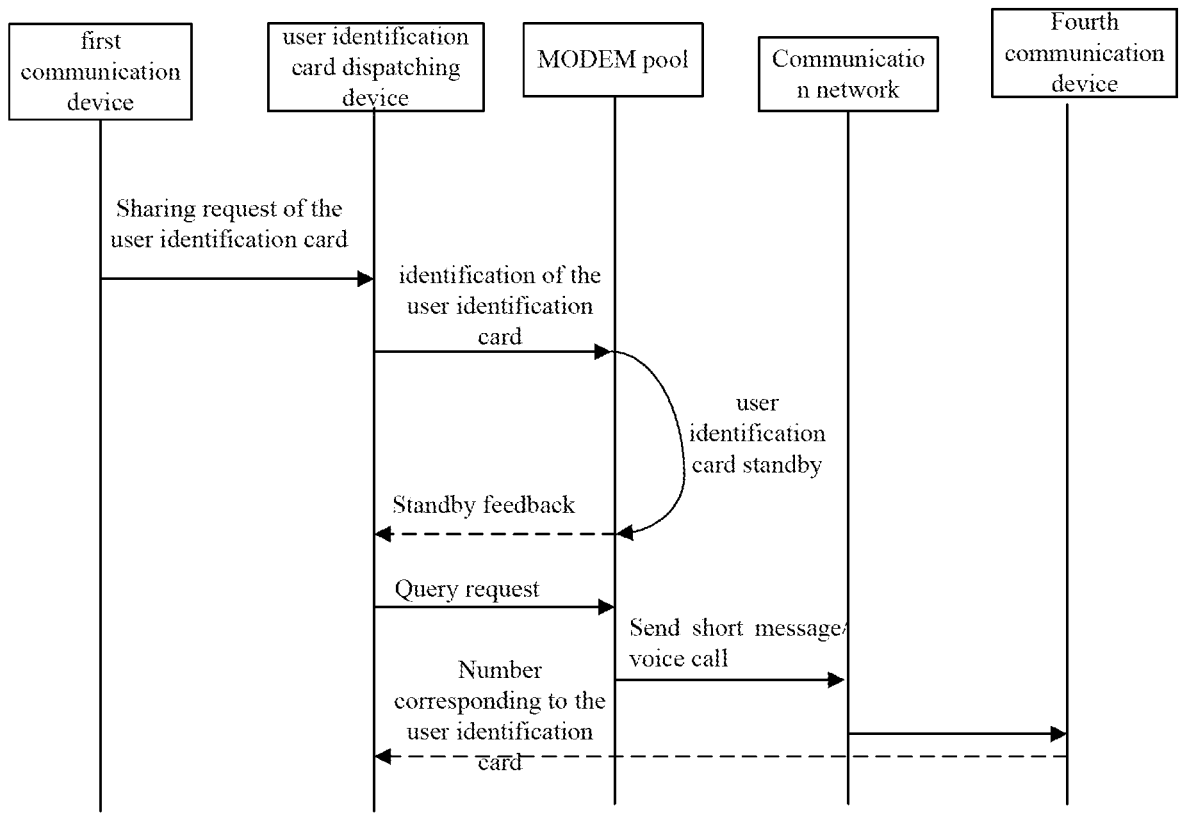
FIG. 12 is an information interaction diagram for acquiring a corresponding phone number information of a shared user identification card through a fourth communication device provided by an embodiment of the present application.

In a non-limiting example, FIG. 12 shows the information interaction flow chart of acquiring the corresponding phone number information of the shared user identification card through the fourth communication device; as shown in FIG. 12, the first communication device sends a sharing request of the user identification card to the user identification card dispatching device; after the user identification card dispatching device receives the sharing request, extracting the identification information of the user identification card in the sharing request and sending it to the MODEM or the MODEM pool to instruct the MODEM or the MODEM pool to put the user identification card in the standby state according to the identification information of the user identification card; the MODEM or the MODEM pool can feedback the standby feedback of the user identification card to the user identification card dispatching device to notify the user that the user identification card dispatching device is in the standby state, or it may not feedback the standby state of the user identification card by default; the user identification card dispatching device sends a short message or initiates a voice call to the fourth communication device through the MODEM or the MODEM pool, and the fourth communication device feeds back the phone number information corresponding the user identification card to the user identification card dispatching device.

In a non-limiting example, the user identification card dispatching device places the user identification card in the standby state in the MODEM pool according to the sharing request of the user identification card, and calls another known phone number corresponding to the user identification card placed in the standby state in the MODEM pool through the MODEM pool, the user identification card dispatching device obtains the caller phone number in the ringing event of the called phone number through the MODEM pool to obtain the phone number information corresponding to the user identification card requested to be shared.

In a non-limiting example, the user identification card dispatching device places the user identification card in the standby state in the modem or modem pool according to the sharing request of the user identification card, and sends a short message to the known phone number terminal through the modem or modem pool. After the terminal receives the short message, the called phone number of the short message is sent to the user identification card dispatching device through the communication network through the preset program, so that the user identification card dispatching device obtains the phone number information corresponding to the user identification card requested to be shared.

In a non-limiting example, the user identification card dispatching device places the user identification card in the standby state in the modem or modem pool according to the sharing request of the user identification card, and sends a short message to the known phone number terminal through the modem or modem pool. After the terminal receives the short message, the called phone number of the short message is sent to the user identification card dispatching device through the network through the preset program, so that the user identification card dispatching device obtains the phone number information corresponding to the user identification card requested to be shared.

In a non-limiting example, the user identification card dispatching device places the user identification card in the standby state in the modem or modem pool according to the sharing request of the user identification card, and calls a known phone number of communication device in the form of virtual phone number interface communication (such as calling an Internet phone) through the modem or modem pool; the user identification card dispatching device obtains the phone number information in the Internet phone ringing event through the phone callback function in the software development kit provided by the Internet phone; thereby the user identification card dispatching device obtains the phone number information corresponding to the user identification card requested to be shared. In order to make it easier for those skilled in the art to understand, the following is a non-limiting example of the application of the callback function of an Internet phone:

```
//state CALL_STATE_RINGING is the ringing state, incoming Number is the incoming number
    public void on Call State Changed (int state, String incoming Number)
{
        switch (state) {
            case Telephony Manager. CALL_STATE_IDLE:
    // hang up
                break;
            case Telephony Manager. CALL_STATE_RINGING:
    // The phone rings, get incoming Number number
    Log.d (Phone Listen Service.T AG,
        "Custom Phone State Listener state: "
    + state + "incoming Number:"
    + incoming Number);
    break;
    case Telephony Manager. CALL_STATE_OFFHOOK:
    break;
        }
    }
```

In a non-limiting example, it is necessary to verify the information of multiple shared user identification cards, and determine the specific shared user identification card information corresponding to the phone number information currently obtained through the fourth communication device through the time sequence of initiating a call. Specifically, the third communication device sequentially initiates a voice call to a fourth communication device according to the identification information of the user identification card of multiple unknown phone numbers; when the fourth communication device sequentially rejects the incoming call, the state of the acquired unknown phone number being hung up corresponds to the timing of the call initiated by the third communication device. In this way, the corresponding relationship between the phone number in the acquired ringing event and multiple unknown phone numbers can be determined.

It can be seen from the above example that, in the case that the interface method for the operator query interface server cannot be obtained, or the phone number information corresponding to the user identification card requested to be shared is obtained through the voice query server or short message server of the operator, the phone number information corresponding to the user identification card can be automatically acquired through the method provided by the example; and the method provided in this example can be used as a supplement to the above embodiment to further verify the phone number information corresponding to the user identification card, thereby improving the verification efficiency and the efficiency of the user identification card sharing system.

Figure 13:
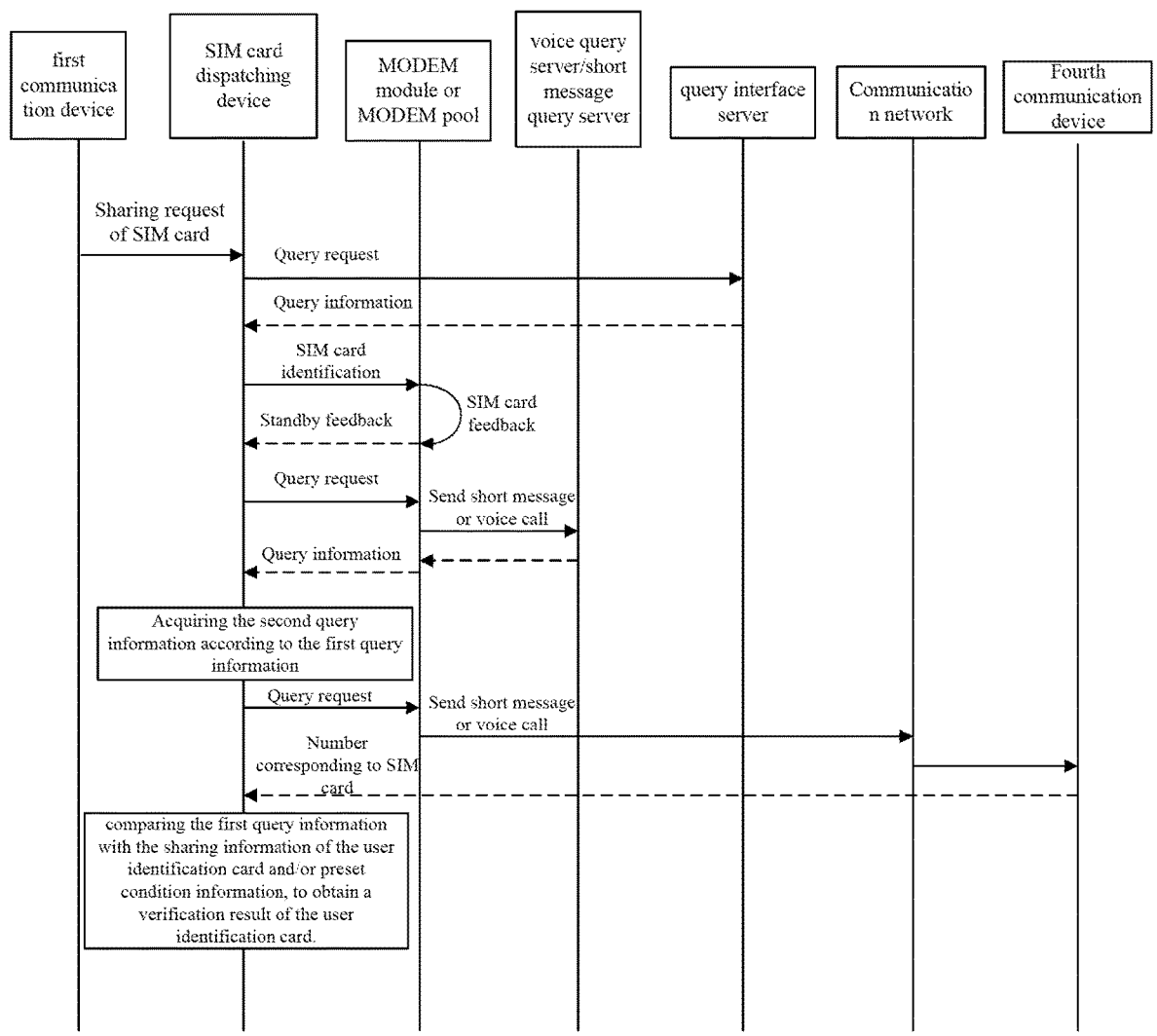
FIG. 13 is an information interaction flowchart of a preferred method for verifying a user identification card provided by an embodiment of the present application.

FIG. 13 shows the information interaction flow chart of a preferred method for verifying information provided by an embodiment of the present application; the method for verifying information in the preferred example combines the above multiple examples by querying the query interface server, the voice query server, and the short message respectively, and acquiring the query information corresponding to the user identification card through the fourth communication device, and comparing the query information with the sharing information of the user identification card and/or preset condition information to verify the sharing information of the user identification card and/or preset condition information; by combining multiple implementation methods, it can make up for the single query method that may lack the query information corresponding to a certain sharing information to be verified, so that it can automatically and efficiently realize the verifying of the sharing information of the user identification card and/or the preset condition information, to further improve the efficiency of the user identification card sharing system.

It should be understood that the size of the sequence number of each step in the foregoing embodiment does not mean the sequence of execution. The execution sequence of each process should be determined by its function and internal logic, and should not constitute any limitation on the implementation process of the embodiment of the present application.

Figure 14:
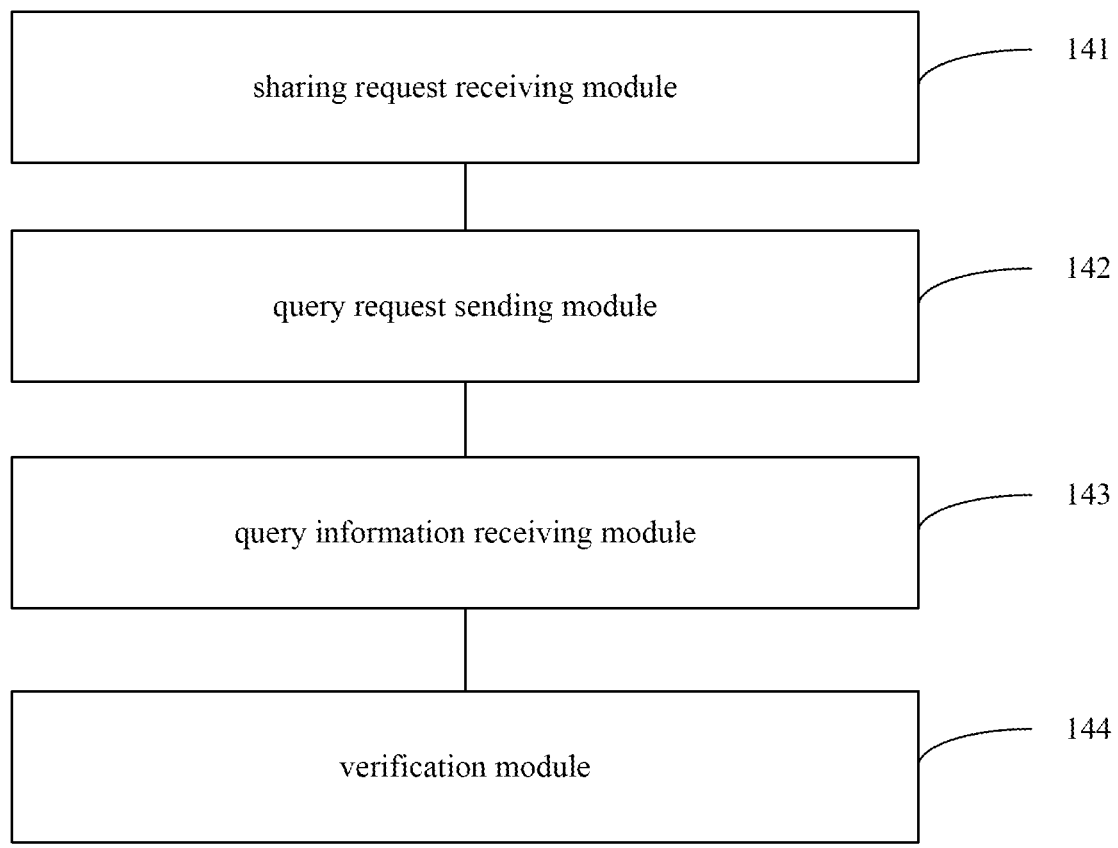
FIG. 14 is a structural block diagram of a device for verifying a user identification card provided by an embodiment of the present application.

Corresponding to the method for verifying the sharing information of the user identification card described in the above embodiment, FIG. 14 shows a structural block diagram of a device for verifying sharing information of a user identification card provided in an embodiment of the present application. For ease of description, only shown the part related to the embodiments of the present application is shown.

Referring to FIG. 14, the device for verifying a user identification card includes:

a sharing request receiving module 141, configured for receiving a sharing request of the user identification card sent by a first communication device; and the sharing request of the user identification card comprises identification information of the user identification card and sharing information of the user identification card;

a query request sending module 142, configured for sending a query request to at least one second communication device according to the sharing request of the user identification card; wherein the query request comprises the identification information of the user identification card; and the query request is configured for instructing the second communication device to query a first query information corresponding to the identification information of the user identification card;

a query information receiving module 143, configured for receiving the first query information sent by the second communication device; and a verification module 144, configured for comparing the first query information with the sharing information of the user identification card and/or preset condition information, to obtain a verification result of the user identification card.

It should be noted that the information interaction and execution process between the above-mentioned devices/units are based on the same concept as the method embodiment of the present application, and its specific functions and technical effects can be found in the method embodiment section, which will not be repeated herein.

Figure 15:
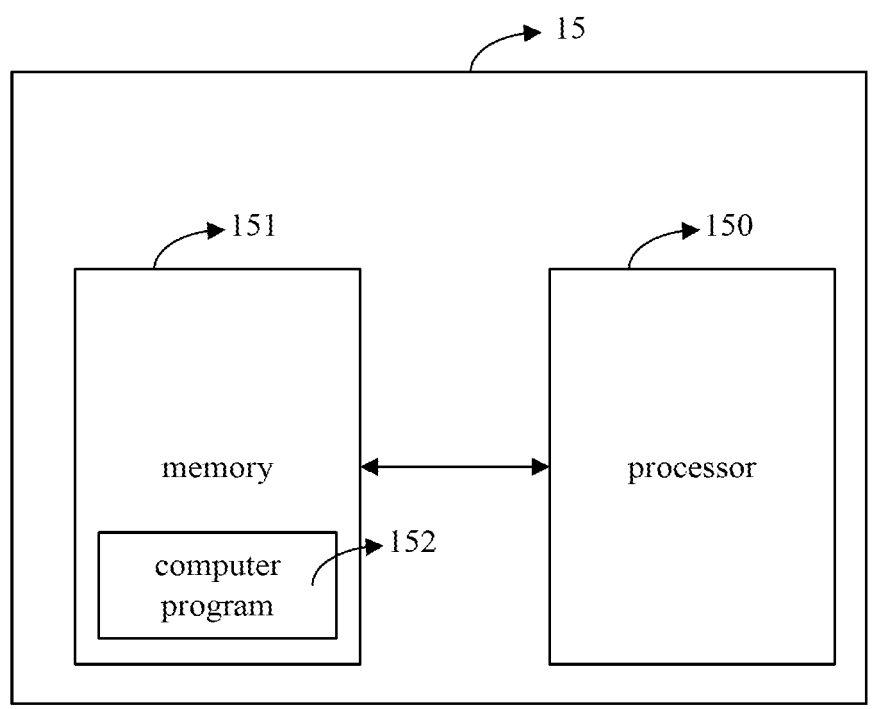
FIG. 15 is a schematic diagram of an electronic device provided by an embodiment of the present application.

FIG. 15 is a schematic diagram of an electronic device provided by an embodiment of the present application. As shown in FIG. 15, the electronic device 15 of the embodiment includes a processor 150, a memory 151, and a computer program 152 stored in the memory 151 and running on the processor 150, such as a verification information program. When the processor 150 executes the computer program 152, the steps in the foregoing embodiments of method for verifying the user identification card are implemented, for example, steps 110 to 114 shown in FIG. 3. Alternatively, when the processor 150 executes the computer program 152, the functions of the modules/units in the foregoing device embodiments, for example, the functions of the modules 141 to 144 shown in FIG. 14 are realized.

Exemplarily, the computer program 152 may be divided into one or more modules/units, and the one or more modules/units are stored in the memory 151 and executed by the processor 150 to complete the present application. The one or more modules/units may be a series of computer program instruction segments capable of completing specific functions, and the instruction segments are used to describe the execution process of the computer program 152 in the terminal device 15.

The terminal device 15 may be a computing device such as a desktop computer, a laptop, a palmtop computer, and a cloud server. The terminal device may include, but is not limited to, a processor 150 and a memory 151. Those skilled in the art can understand that FIG. 15 is only an example of the terminal device 15, and does not constitute a limitation on the terminal device 15. It may include more or less components than shown in the figure, or a combination of certain components, or different components. For example, the terminal device may also include input and output devices, network access devices, buses, and so on.

The so called processor 150 can be CPU (Central Processing Unit), and can also be other general purpose processor, DSP (Digital Signal Processor), ASIC (Application Specific Integrated Circuit), FGPA (Field-Programmable Gate Array), or some other programmable logic devices, discrete gate or transistor logic device, discrete hardware component, etc. The general purpose processor can be a microprocessor, or alternatively, the processor can also be any conventional processor and so on.

The memory 151 can be an internal storage unit of the terminal device 15, such as a hard disk or a memory of the terminal device 15. The memory 151 can also be an external memory of the terminal device 15, such as a plug-in hard disk, a SMC (Smart Media Card), a SD (Secure Digital) card, a FC (Flash Card) equipped on the terminal device 15. Further, the memory 151 may include both the internal storage unit and the external storage device of the terminal device 15, either. The memory 151 is configured to store the computer programs, and other procedures and data needed by the terminal device 5 for determining wellbore cross-sectional shape. The memory 151 can also be configured to storing data that has been output or being ready to be output temporarily.

It can be clearly understood by the persons skilled in the art that, for describing conveniently and concisely, dividing of the aforesaid various functional units, functional modules is described exemplarily merely, in an actual application, the aforesaid functions can be assigned to different functional units and functional modules to be accomplished, that is, an inner structure of a data synchronizing device is divided into functional units or modules so as to accomplish the whole or a part of functionalities described above. The various functional units, modules in the embodiments can be integrated into a processing unit, or each of the units exists independently and physically, or two or more than two of the units are integrated into a single unit. The aforesaid integrated unit can by either actualized in the form of hardware or in the form of software functional units. In addition, specific names of the various functional units and modules are only used for distinguishing from each other conveniently, but not intended to limit the protection scope of the present application. Regarding a specific working process of the units and modules in the aforesaid device, reference can be made to a corresponding process in the aforesaid method embodiments, it is not repeatedly described herein.

In the aforesaid embodiments, the description of each of the embodiments is emphasized respectively, regarding a part of one embodiment which isn't described or disclosed in detail, please refer to relevant descriptions in some other embodiments.

Those skilled in the art may aware that, the elements and algorithm steps of each of the examples described in connection with the embodiments disclosed herein can be implemented in electronic hardware, or in combination with computer software and electronic hardware. Whether these functions are implemented by hardware or software depends on the specific application and design constraints of the technical solution. The skilled people could use different methods to implement the described functions for each particular application, however, such implementations should not be considered as going beyond the scope of the present application.

It should be understood that, in the embodiments of the present application, the disclosed device/terminal device and method could be implemented in other ways. For example, the device described above are merely illustrative; for example, the division of the units is only a logical function division, and other division could be used in the actual implementation, for example, multiple units or components could be combined or integrated into another system, or some features can be ignored, or not performed. In another aspect, the coupling or direct coupling or communicating connection shown or discussed could be an indirect, or a communicating connection through some interfaces, devices or units, which could be electrical, mechanical, or otherwise.

The units described as separate components could or could not be physically separate, the components shown as units could or could not be physical units, which can be located in one place, or can be distributed to multiple network elements. Parts or all of the elements could be selected according to the actual needs to achieve the object of the present embodiment.

In addition, the various functional units in each of the embodiments of the present application can be integrated into a single processing unit, or exist individually and physically, or two or more than two units are integrated into a single unit. The aforesaid integrated unit can either be achieved by hardware, or be achieved in the form of software functional units.

The embodiments of the present application also provide a computer readable storage medium, where the computer readable storage medium stores a computer program, and when the computer program is executed by a processor, the steps in the foregoing method embodiments can be realized.

The embodiments of the present application provide a computer program product. When the computer program product is running on an electronic device, the steps in the foregoing method embodiments can be realized when the electronic device is executed.

If the integrated unit is achieved in the form of software functional units, and is sold or used as an independent product, it can be stored in a computer readable storage medium. Based on this understanding, a whole or part of flow process of implementing the method in the aforesaid embodiments of the present application can also be accomplished by using computer program to instruct relevant hardware. When the computer program is executed by the processor, the steps in the various method embodiments described above can be implemented. Wherein, the computer program comprises computer program codes, which can be in the form of source code, object code, executable documents or some intermediate form, etc. The computer readable medium can include: any entity or device that can carry the computer program codes, recording medium, USB flash disk, mobile hard disk, hard disk, optical disk, computer storage device, ROM (Read-Only Memory), RAM (Random Access Memory) and software distribution medium, etc.

As stated above, the aforesaid embodiments are only intended to explain but not to limit the technical solutions of the present application. Although the present application has been explained in detail with reference to the above-described embodiments, it should be understood for the ordinary skilled one in the art that, the technical solutions described in each of the above-described embodiments can still be amended, or some technical features in the technical solutions can be replaced equivalently; these amendments or equivalent replacements, which won't make the essence of corresponding technical solution to be broken away from the spirit and the scope of the technical solution in various embodiments of the present application, should all be included in the protection scope of the present application.

Obviously, many modifications and variations of the present invention are possible in light of the above teachings. It is, therefore, to be understood that the invention may be practiced otherwise than as specifically described while still being within the scope of the invention.

What is claimed is:

1. A method for verifying a user identification card, comprising:
   receiving a sharing request of the user identification card sent by a first communication device; wherein the sharing request of the user identification card comprises identification information of the user identification card and sharing information of the user identification card;
   sending a query request to at least one second communication device according to the sharing request of the user identification card; wherein the query request comprises the identification information of the user identification card; and the query request is configured for instructing the second communication device to query a first query information corresponding to the identification information of the user identification card;
   receiving the first query information sent by the second communication device; and
   comparing the first query information with the sharing information of the user identification card and/or preset condition information, to obtain a verification result of the user identification card;
   wherein the sending a query request to the second communication device according to the sharing request of the user identification card comprises:
   sending a query request to the second communication device through a third communication device according to the sharing request of the user identification card;
   correspondingly, the receiving the first query information sent by the second communication device comprises:

receiving the first query information sent by the second communication device through the third communication device; and wherein before comparing the first query information with the sharing information of the user identification card and/or the preset condition information, further comprises:

sending a short message to a fourth communication device through the third communication device according to the sharing request of the user identification card, or calling the fourth communication device through the third communication device to obtain a phone number corresponding to the user identification card.

2. The method according to claim 1, wherein the second communication device is a query interface server;

correspondingly, the sending a query request to the second communication device according to the sharing request of the user identification card comprises:

sending a query request to the query interface server through the query interface of the query interface server according to the sharing request of the user identification card;

the receiving the first query information sent by the second communication device comprises:

receiving the first query information sent by the query interface server through the query interface.

3. The method according to claim 1, wherein before sending the query request to the second communication device through the third communication device, further comprises:

sending the identification information of the user identification card to the third communication device to instruct the third communication device to place the user identification card in a standby state according to the identification information of the user identification card.

4. The method according to claim 3, wherein the third communication device is at least one of the following devices for receiving the identification information of the user identification card and communicating through the identification information of the user identification card:

a mobile terminal, a fixed terminal, a modem module, a modem module pool, an internet phone server and a short message server.

5. The method according to claim 1, wherein the third communication device is at least one of the following devices for receiving the identification information of the user identification card and communicating through the identification information of the user identification card:

a mobile terminal, a fixed terminal, a modem module, a modem module pool, an internet phone server and a short message server.

6. The method according to claim 1, wherein the second communication device comprises: a voice query server or a short message query server;

correspondingly, the first query information comprises: a voice query information or a short message query information.

7. The method according to claim 6, wherein the comparing the first query information with the sharing information of the user identification card and/or the preset condition information to obtain the verification result of a corresponding information of the user identification card comprises:

identifying the voice query information or the short message query information in the first query information to obtain second query information; and comparing the second query information with the sharing information of the user identification card and/or the preset condition information, to obtain a verification result of a corresponding information of the user identification card.

8. The method according to claim 1, wherein the obtaining the phone number corresponding to the user identification card comprises:

acquiring a phone number corresponding to the user identification card through the short message or call information fed back by the fourth communication device;

or, acquiring a phone number corresponding to the user identification card through intercepting the short message or a call ringing event.

9. The method according to claim 1, wherein the fourth communication device is:

a modem module or a virtual communication device with a known phone number in the modem module pool; or,
a communication device with a known phone number that communicates via a virtual phone number interface; or,
a terminal device with a known phone number.

10. The method according to claim 1, wherein the preset condition information is:

threshold condition information and/or attribute condition information of the user identification card;

wherein the threshold condition information comprises at least one of the following thresholds: a tariff balance threshold, a data traffic margin threshold, a voice duration margin threshold, and a short message margin threshold.

11. An electronic device, comprising a memory, a processor, and a computer program stored in the memory and running on the processor, wherein the processor executes the computer program implementing the following steps:

receiving a sharing request of the user identification card sent by a first communication device; wherein the sharing request of the user identification card comprises identification information of the user identification card and sharing information of the user identification card;

sending a query request to at least one second communication device according to the sharing request of the user identification card; wherein the query request comprises the identification information of the user identification card; and the query request is configured for instructing the second communication device to query a first query information corresponding to the identification information of the user identification card;

receiving the first query information sent by the second communication device; and comparing the first query information with the sharing information of the user identification card and/or preset condition information, to obtain a verification result of the user identification card;

wherein the sending a query request to the second communication device according to the sharing request of the user identification card comprises:

sending a query request to the second communication device through a third communication device according to the sharing request of the user identification card;

correspondingly, the receiving the first query information sent by the second communication device comprises:

receiving the first query information sent by the second communication device through the third communication device; and wherein before comparing the first query information with the sharing information of the user identification card and/or the preset condition information, further comprises:

sending a short message to a fourth communication device through the third communication device according to the sharing request of the user identification card, or calling the fourth communication device through the third communication device to obtain a phone number corresponding to the user identification card.

12. A non-transitory computer readable storage medium storing a computer program, wherein the processor executes the computer program implementing the following steps:

receiving a sharing request of the user identification card sent by a first communication device; wherein the sharing request of the user identification card comprises identification information of the user identification card and sharing information of the user identification card;

sending a query request to at least one second communication device according to the sharing request of the user identification card; wherein the query request comprises the identification information of the user identification card; and the query request is configured for instructing the second communication device to query a first query information corresponding to the identification information of the user identification card;

receiving the first query information sent by the second communication device; and comparing the first query information with the sharing information of the user identification card and/or preset condition information, to obtain a verification result of the user identification card;

wherein the sending a query request to the second communication device according to the sharing request of the user identification card comprises:

sending a query request to the second communication device through a third communication device according to the sharing request of the user identification card;

correspondingly, the receiving the first query information sent by the second communication device comprises:

receiving the first query information sent by the second communication device through the third communication device; and wherein before comparing the first query information with the sharing information of the user identification card and/or the preset condition information, further comprises:

sending a short message to a fourth communication device through the third communication device according to the sharing request of the user identification card, or calling the fourth communication device through the third communication device to obtain a phone number corresponding to the user identification card.

* * * * *